United States Patent [19]

Yew

[11] 4,271,948
[45] Jun. 9, 1981

[54] CLUTCH HAVING SEGMENTED BAND

[75] Inventor: Kwang Yew, Chatham, Canada

[73] Assignee: Canadian Fram Limited, Chatham, Canada

[21] Appl. No.: 21,041

[22] Filed: Mar. 16, 1979

[51] Int. Cl.³ ............................................ F16D 11/00
[52] U.S. Cl. ............................. 192/84 T; 192/107 T
[58] Field of Search ............... 192/84 T, 84 R, 107 T, 192/53 D

[56] References Cited

U.S. PATENT DOCUMENTS

| 432,209 | 7/1890 | McLaughlin | 192/84 T |
|---|---|---|---|
| 2,385,906 | 10/1945 | Zeilman | 192/84 T X |
| 2,534,033 | 12/1950 | La Brie | 192/84 T X |
| 2,723,738 | 11/1955 | Pesek | 192/84 T |
| 2,774,455 | 12/1956 | Goldberg | 192/107 T |
| 2,784,824 | 3/1957 | Hanslip | 192/107 T |
| 2,863,543 | 12/1958 | Spase | 192/107 T X |
| 3,483,955 | 12/1969 | Schell | 192/107 T |
| 3,704,770 | 12/1972 | Spencer | 192/84 R |

Primary Examiner—Nile C. Byers, Jr.

Attorney, Agent, or Firm—Ken C. Decker; William N. Antonis

[57] ABSTRACT

An electromechanical clutch for vehicle engine cooling fans includes a driving member mounted for rotation by the vehicle engine and a driven member carrying the engine fan and rotatably mounted on the driving member. The driven and driving members cooperate to define a circumferentially extending gap therebetween. The driving member carries an electrical coil, which is energized when the clutch is to be engaged. A band is disposed within the gap, includes an outer band member which carries a frictional material that is adapted to frictionally engage the driven member and an inner band member which is adapted to engage the driving member when the coil is actuated. The inner and outer members are connected at corresponding ends thereof. The inner member comprises arcuate segments of electromagnetic material and joining segments which interconnects the arcuate segments. The joining segment is made from a relatively flexible, resilient material to permit relative radial movement between the arcuate segments, thereby permitting the arcuate segments to flex relative to one another when the coil is energized.

10 Claims, 3 Drawing Figures

CLUTCH HAVING SEGMENTED BAND

BACKGROUND OF THE INVENTION

This invention relates to an electromechanical clutch for an engine cooling fan.

Experience has conclusively demonstrated that operation of the engine cooling fan is necessary only during a relatively small percentage of the time that a vehicle engine is operated. If the fan is driven when it is not necessary, the power used to rotate the fan is wasted, thereby increasing gasoline consumption. Accordingly, it is desirable to provide a clutch which engages the fan to rotate with the vehicle engine when the cooling effect of the fan is needed but which disengages the fan when its cooling effect is not needed. Such a fan clutch is disclosed in prior U.S. Pat. Application Ser. No. 900,829, filed Apr. 28, 1978 now U.S. Pat. No. 4,217,976, and in pending U.S. Pat. Application Ser. No. 951,103, filed Oct. 13, 1978. Both of these applications disclose an electromechanical clutch which includes a flexible band member that provides the driving connection between the driven and driving members of the clutch.

The present invention is an improvement over the clutches disclosed in these prior applications, and permits better wrapping of the band about the driving member to give the clutch a higher torque capacity.

SUMMARY OF THE INVENTION

One problem with the band members used in the clutch as described in the aforementioned application is that they must be made from a magnetic material that is relatively inflexible. A more flexible material would permit better wrapping of the band around the driving member, thereby giving the clutch a higher torque capacity. Also a more flexible band decreases the electromagnetic force required to hold the band against the driving member, thereby permitting a higher torque capacity at the same level of electromagnetic force. Another problem with an inflexible band is that manufacturing the band to the shape of the driving member, which it must engage, is relatively difficult. Accordingly, the present invention provides an inner and outer band member for engagement with the driving and driven members respectively. The inner band member, which must engage the driven member when the coil is actuated, is comprised of three arcuate segments joined together by relatively flexible interconnecting segments. The three arcuate segments may be easily manufactured to conform to the shape of the member, since each of the arcuate segments only covers a segment of the arcuate surface of the driving member. In the design described in the above-mentioned applications, the band member must be manufactured to conform to the shape of the driven member throughout its circumferential extent. Also, each of the arcuate segments may be made from a different material, so that the segment on one end of the inner band may be chosen from a material giving better wear characteristics, and the material comprising the segment at the other end the band may be selected to give better magnetic properties, which improves the wrapping force. On the other hand, the flexible segments interconnecting the arcuate segments may be made from a nonmagnetic material, to thereby provide flexibility between the arcuate segments.

Accordingly, an important object of my invention is to provide an electromechanical, band actuated clutch which provides a flexible band member to thereby provide better wrapping characteristics of the band about the driving member to thereby give the clutch improved torque capacity.

Another important object of my invention is to provide a band actuated electromechanical clutch in which different portions of the band can be made from different materials thereby allowing selection of materials for better wear at one end of the band and for better magnetic properties at the other end of the band.

Still another important object of my invention is to provide a band for an electromechanical, band actuated clutch which includes a band which is more easily manufactured than the bands which must completely encircle the clutch with a single continuous member.

DETAILED DESCRIPTION

Figure 1:
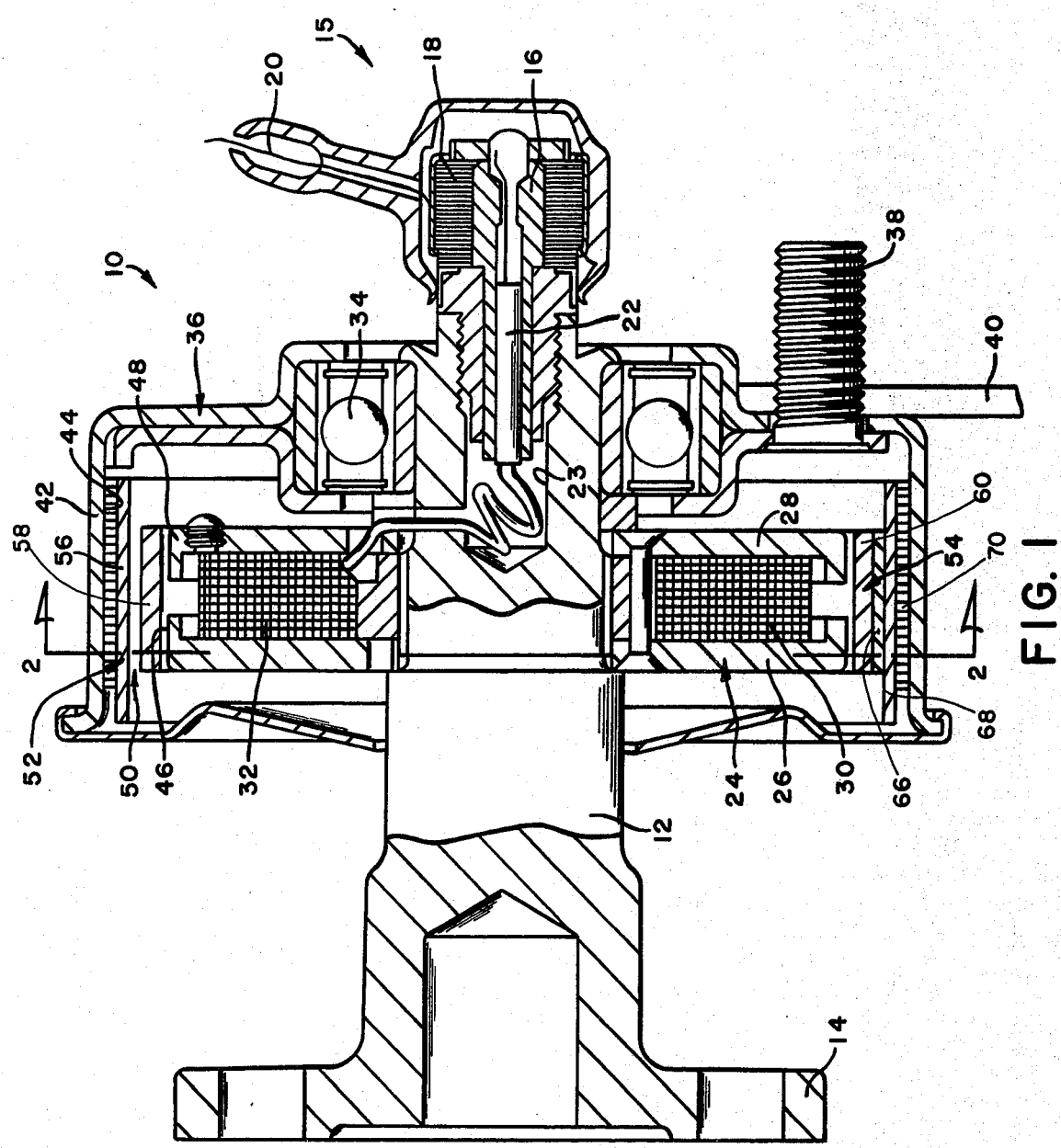
FIG. 1 is an axial cross-sectional view of a clutch and fan assembly made pursuant to the teachings of my present invention.

Referring now to the drawing, a clutch and fan assembly generally indicated by the numeral 10 includes a driving member 12 which terminates in a flange 14 for connection with the vehicle engine (not shown), so that the driving member 12 is rotated by operation of the engine. The other end of the driving member 12 carries a slip ring assembly generally indicated by the numeral 15. The slip ring assembly includes a member 16 which is fixed for rotation with the driving member 12 and a slip member 18 which is mounted so that the member 16 can rotate relative to the member 18. Connecting wires 20, 22 extend from the members 18 and 16 respectively, so that an electrical connection is provided between the connecting wires 20 and 22 by the members 16 and 18 of the slip ring assembly 15. The connecting wire 20 is connected to appropriate vehicle engine temperature and/or air conditioning pressure sensors of a type well-known to those skilled in the art. Since these sensors are conventional, they will not be described in detail herein. The connecting wire 22 is carried within passage 23 in the driving member 12.

The driving member 12 also carries a circumferentially extending spool 24 which is made of magnetic material and which is mounted for rotation with the driving member 12. The spool 24 includes a pair of axially spaced, circumferentially extending pole piece portions 26, 28 which circumscribe the driving member 12 and which cooperate with one another to define a cavity 30 therebetween. An electromagnetic coil comprises windings 32 disposed in the cavity 30, which are wrapped circumferentially around the driving member 12. The windings 32 are connected with the connecting wire 22, so that when an electrical signal is transmitted through the connecting wire 20, electrical current will be transmitted to the coil 32 by the connecting wire 20, the slip ring 15, and the connecting wire 22.

A bearing 34 mounted on the driving member 12 between the bracket 24 and the slip ring assembly 15, mounts a driven member 36 for rotation relative to the driving member 12. Bolts 38 attach fan blades 40 to the driven member 36, so that the fan blades 40 are rotated with the driven member 36. Of course, it will be understood by those skilled in the art that additional fan blades 40 are spaced circumferentially around the periphery of the driven member 36 in a manner well-known to those skilled in the art. The driven member 36 further includes an axially extending portion 42 which projects from the driven member 36 and which circumscribes the pole piece portions 26 and 28 of the spool 24. The inner circumferential surface 44 of the portion 42 cooperates with the outer circumferential edges 46, 48 of the pole piece portions 26 and 28 to define a gap 50 therebetween. A circumferentially extending band 52 is disposed in the gap 50.

Figure 2:
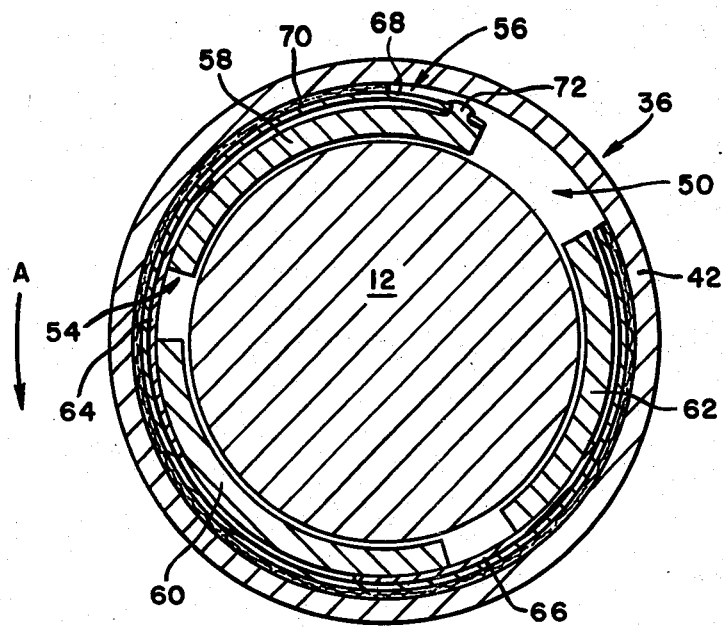
FIG. 2 is a cross-sectional view taken substantially along lines 2—2 of FIG. 1.
Figure 3:
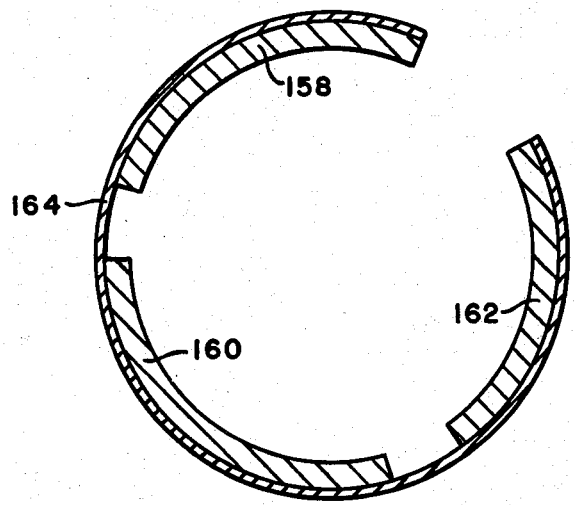
FIG. 3 is a cross-sectional view of an alternate embodiment of the inner band member used in the clutch illustrated in FIGS. 1 and 2.

The band 52 includes an inner band member 54 and an outer band member generally indicated by the numeral 56. The inner band member 54 includes circumferentially spaced, arcuately extending segments 58, 60, and 62. These arcuate segments are made from electromagnetic material and are shaped to conform to the outer circumferential surfaces of the pole piece portions 46, 48. The arcuate segments 58, 60 and 62 are interconnected by flexible joining segments 64, 66 of the inner band 54. As can be seen in FIG. 2, joining segment 64 connects one end of the arcuate segment 58 with an adjacent end of the arcuate segment 60, and flexible segment 66 interconnects the other end of the arcuate segment 60 with the adjacent end of the segment 62. The joining, flexible segments 64, 66 of the inner band 54 are made from a relatively flexible, nonmagnetic material to permit relative radial movement between the arcuate segments 58, 60 and 62. Instead of the discrete joining segments 64 and 66, a single joining rim may be used to interconnect all of the arcuate segments 58, 60, and 62, as most clearly shown in the alternate embodiment of the inner band member illustrated in FIG. 3, wherein the rim or band 164 interconnects the arcuate segments 158, 160, and 162. In either case, the arcuate segments 58, 60 and 62 extend axially a sufficient distance such that the arcuate segments 58, 60 and 62 bridge the cavity 30 in which the magnetic coil consisting of windings 32 is housed. Of course, design constraints may dictate the use of more or fewer than three arcuate segments, depending upon the application involved.

The outer band member 56 includes a strip of resilient, nonmagnetic material 68 and a corresponding strip of frictional material 70 which is bonded to the outer circumferential surface of the strip 68. The strip of frictional material 70 may be of any conventional type well-known to those skilled in the art. A detent 72 projects radially from the outer circumferential surface of the arcuate segment 58 adjacent the end thereof opposite the end to which the joining segment 64 is fastened. The projection or detent 72 engages a corresponding slot provided in the strip 68 of the outer band member 56, thereby joining the inner and outer band members together for transmission of driving forces therebetween. The ends of the inner and outer band members opposite the ends thereof carrying the detent 72 and corresponding slot are free to permit relative radial movement between the band members.

The strip of resilient material 68 assumes a relaxed or free shape which is different from the arcuate shape of the gap. Accordingly, when the inner and outer band members are installed in the gap 50, the resiliency of the strip 68 yieldably urges the frictional material 70 into frictional engagement with the driven member 36.

MODE OF OPERATION

The various components of the clutch mechanism 10 are illustrated in the drawings in the position they assume when the clutch is disengaged. In this condition, the driving member 12, of course, will be rotated by the vehicle engine, but the driven member 36 will not be driven thereby, because there is no driving connection between the driving member 12 and the driven member 36 and the bearing 34 permits the driving member 12 to rotate without driving the driven member 36 unless the clutch mechanism is engaged. When the aforementioned temperature and/or pressure sensors (not shown) sense an engine operating condition in which operation of the engine cooling fan is required, an electrical signal is transmitted through the connecting wires 20 and 22 to energize the coil comprising the windings 32. When this occurs, magnetic flux created in the magnetic circuit defined by the pole piece portions 26, 28 and the arcuate segments 58, 60, 62 of the inner band member 54 causes the latter to move radially, viewing FIGS. 1 and 2, in a direction toward the pole pieces 26, 28. Consequently, the inner edges of the segments 58, 60, 62 will be brought into engagement with the outer circumferential edges 46, 48 of the pole piece portions 26, 28.

Forces exerted on the inner band member 54 due to engagement of the latter with the driving member 12 are transmitted to the outer band member 56 through the detent 70 and corresponding slot in strip 68. Because of the resiliency of the strip 68, the frictional material 70 is loaded against the driven member 36 with a predetermined force. Accordingly, frictional material 70 is loaded against the driven member 36 with a predetermined force. Because of the transmission of the forces between the inner and outer band members 54 and 56, a servo action well-known to those skilled in the art occurs in which a relatively small actuating force is multiplied many times by the wrapping effect of the band members. Accordingly, the force with which the strip 64 is loaded against the driven member 36 is a function of this servo multiplied actuation force. Since the force required to initiate slippage between the strip of frictional material 70 and the driven member 36 is a function of the loading force, slippage will occur between the frictional material 70 and the driven member 36 upon engagement of the clutch if transmitted torque levels are greater than a predetermined maximum. Accordingly, slippage does not occur between the segments 58, 60 and 62 and the pole pieces 36, 38, thereby avoiding the premature wear of these components which might be caused by slippage between them.

Because the arcuate segments 58, 60, 62 extend over relatively short arcuate segments of the pole piece portions 46, 48, they can be easily manufactured such that their inner circumferential surfaces conform to the shape of the outer circumferential surface of the pole piece portions. Insuring conformity between the band and the pole piece portions is quite difficult if the band extends over a substantial portion of the circumferential length of the pole piece portions, but is relatively easy if the arcuate segments are discrete and extend over a relatively small proportion of the circumferential surface. Furthermore, the flexibility permitted between the arcuate segments 58, 60 and 62 by the joining segments 64, 66 improves wrapping of the band around the pole piece portions, since the relative movement permitted between the segments permits each segment to engage its portion of the outer circumferential surface of the pole piece portions, thereby avoiding spot contact which reduces the holding and wrapping forces. Also, the flexibility of the inner band member 54 due to the discrete segments interconnected by the joining segments permits the band to conform to the gap when the clutch is disengaged, thereby insuring a drag-free operation of the clutch during fan disengagement. Finally, discrete arcuate segments 58, 60, 62 may be made from different materials. For example, the force generated by engagement of the arcuate segment 62 with the pole piece portion is multiplied several times due to the wrapping effect of the band. Accordingly, it is important that segment 62 may be made from a material having good magnetic properties. On the other hand, segments 60 and 62 may be made from a less expensive material, or, may be made from a material having better wear characteristics than is the arcuate segment 62.

I claim:

1. In a clutch, a pair of coaxial, relatively rotatable members comprising a driving member and a driven member, a band wrapped around one of said members, and electromagnetic means carried by said one member for urging said band into driving engagement with said one member, said relatively rotatable members having radially offset portions extending therefrom defining a gap therebetween, said band being located in said gap and having relatively movable inner and outer band members, one of said band members engaging the corresponding radially offset portion extending from said one relatively rotatable member when the clutch is engaged, the other band member carrying a friction surface frictionally engaging the other relatively rotatable member to establish a driving connection therewith when the clutch is engaged, said one band member comprising at least a pair of circumferentially spaced arcuate segments and a joining segment interconnecting the arcuate segments.

2. The invention of claim 1:
wherein said joining segment is made from resilient material to permit relative movement between the arcuate segments.

3. The invention of claim 2:
wherein the joining segment is made from nonmagnetic material and the arcuate segments are made from magnetic material.

4. The invention of claim 2:
wherein said radially offset portions are substantially circular, and the curvature of said arcuate segments matches the curvature of said corresponding radial offset portions so that the arcuate segments can engage the one radial offset portion when the clutch is engaged.

5. The invention of claim 4:
wherein said arcuate segments have radially offset curved sides, one of said sides of each of said arcuate segments facing the one radial offset portion, said joining segment being secured to the other sides of each of said arcuate segments.

6. In a clutch, a pair of coaxial, relatively rotatable members comprising a driving member and a driven member, said members having radially offset curved portions defining a circumferentially extending gap therebetween, a band located in said gap, electromagnetic means carried by one of said members for urging the band into driving engagement with a corresponding one of said curved portions and means including a friction coupling drivingly engaging the band with the other member, said band comprising circumferentially spaced, arcuately extending segments having radially offset curved sides, the curvature of one side of each of said segments substantially matching the curvature of said corresponding curved portion, so that said one side of each of the segments can engage the curved portion upon engagement of the clutch, and means providing a flexible connection between said segments.

7. The invention of claim 6:
wherein said means providing a flexible connection is an arcuate element circumscribing at least a portion of each of said segments and connected thereto.

8. The invention of claim 6:
wherein said means providing a flexible connection comprises joining segments joining adjacent arcuate segments.

9. The invention of claim 8:
wherein said joining segments are fastened to the other sides of said segments.

10. The invention of claim 9:
wherein the friction coupling includes circumferentially extending structure circumscribing at least a portion of said band and fastened thereto, said structure having an outer circumferential surface carrying a circumferentially extending segment of friction material for frictionally engaging said other member.

* * * * *